United States Patent [19]

Okada

[11] Patent Number: 5,669,600
[45] Date of Patent: Sep. 23, 1997

[54] X-Y TABLE

[75] Inventor: Manabu Okada, Hamamatsu, Japan

[73] Assignee: NTN Corporation, Osaka, Japan

[21] Appl. No.: 644,419

[22] Filed: May 10, 1996

[30] Foreign Application Priority Data

May 31, 1995 [JP] Japan .................................. 7-133198

[51] Int. Cl.$^6$ .................................................. B23Q 1/25
[52] U.S. Cl. ........................................................ 269/73
[58] Field of Search ................................ 269/73, 58, 71, 269/72, 289 R, 35, 80; 359/391, 392, 393

[56] References Cited

U.S. PATENT DOCUMENTS

| 4,129,291 | 12/1978 | Kato et al. ................... | 269/73 |
| 4,234,175 | 11/1980 | Sato et al. .................... | 269/73 |
| 4,615,515 | 10/1986 | Suzuta et al. ................. | 269/73 |
| 4,684,315 | 8/1987  | Sugishima et al. ........... | 269/73 |
| 4,834,353 | 5/1989  | Chitayat ....................... | 269/73 |
| 5,022,619 | 6/1991  | Mamada ....................... | 269/73 |

*Primary Examiner*—Robert C. Watson
*Assistant Examiner*—Thomas W. Lynch
*Attorney, Agent, or Firm*—Wenderoth, Lind & Ponack

[57] ABSTRACT

An X-Y table produces no dust and maintains a high positioning accuracy. Slide blocks are slidably mounted on an x-axis bar guide and a y-axis bar guide through air bearings. They are moved along the respective bar guides by linear motors. A sub-bar guide is fixed to one end of the slide block supported on the x-axis bar guide. It extends through a hole formed in a stage to slidably support the stage through an air bearing. Another sub-bar guide has its one end fixed to the stage and extends through a hole formed in the slide block supported on the y-axis bar guide to slidably support it through an air bearing. The x-axis motor has a yoke having a top surface opposite the bottom surface of the stage. Permanent magnets provided on the bottom surface of the stage attracts the top surface of the yoke. The stage is moved in the x-axis and y-axis directions while keeping it out of contact with the yoke by balancing the magnetic attraction force of the permanent magnets with the pressure of compressed air injected through nozzles of the stage against the top surface of the yoke.

3 Claims, 6 Drawing Sheets

X-Y TABLE

BACKGROUND OF THE INVENTION

This invention relates to an X-Y table used in a semiconductor manufacturing or inspecting device such a bonding machine.

X-Y tables have a stage which can be moved in the x- and y-axis directions with a workpiece-supporting table carried thereon. Conventional X-Y tables include a base, a movable platen supported on the base, and a stage placed on the movable platen. The movable platen can be moved linearly in one direction, while the stage can be moved on the platen in a direction perpendicular to the direction in which the platen is moved.

In this conventional X-Y table, cloth roller guides are used to guide the movable platen and the stage. Namely, these moving parts are kept in mechanical contact with other members while moving. Thus, it is impossible to prevent wear at the contact portions. Positioning accuracy will soon decrease as wear progresses. The life of the X-Y table is thus short. Dust will be also be produced due to friction.

While the movable platen is moving, the weight of the stage bears on the platen. Thus, the total weight of the moving parts is rather heavy, so that it is difficult to control and move the moving parts to a desired position with high accuracy.

SUMMARY OF THE INVENTION

An object of this invention is to provide an X-Y table which produces no dust, and which has a long life, while maintaining a high degree of positioning accuracy.

According to this invention, there is provided an X-Y table comprising a base, an x-axis bar guide and a y-axis bar guide provided over the base so as to extend perpendicular to each other. Two slide blocks are slidably supported on the respective bar guides through air bearings. A y-axis sub-bar guide extends parallel to the y-axis bar guide and has one end thereof fixed to one of the slide blocks that is slidably supported on the x-axis bar guide. An x-axis sub-bar guide extends parallel to the x-axis bar guide and is slidably supported through an air bearing on the other of the slide blocks. A stage is slidably supported on the y-axis sub-bar guide through an air bearing. The x-axis sub-bar guide has one end thereof fixed to the stage. An x-axis linear motor and a y-axis linear motor move the respective slide blocks along the X-axis bar guide and the Y-axis bar guide, the motors having yokes supported on the base. The yoke of the x-axis linear motor has a guide surface along which the stage moves, the stage having a bottom surface opposite the guide surface. A permanent magnet is buried in the bottom surface of the stage for producing a magnetic circuit between the stage and the yoke. The stage is formed with a plurality of nozzles for injecting compressed air into the space between the stage and the guide surface.

In another arrangement, the x-axis sub-bar guide extends through the stage to slidably support the stage through an air bearing, and has one end thereof fixed to the slide block slidably supported on the y-axis bar guide.

Compressed air is injected through the nozzles formed in the stage against the guide surface to keep the stage out of contact with the guide surface, with the pressure of the air film formed between the stage and the guide surface balancing with the magnetic attraction force with which the yoke is attracted to the magnets. In this state, the x-axis and y-axis linear motors are activated to move the stage in the x-axis and y-axis directions.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

The embodiments of this invention are described with reference to the accompanying drawings.

Figure 1:
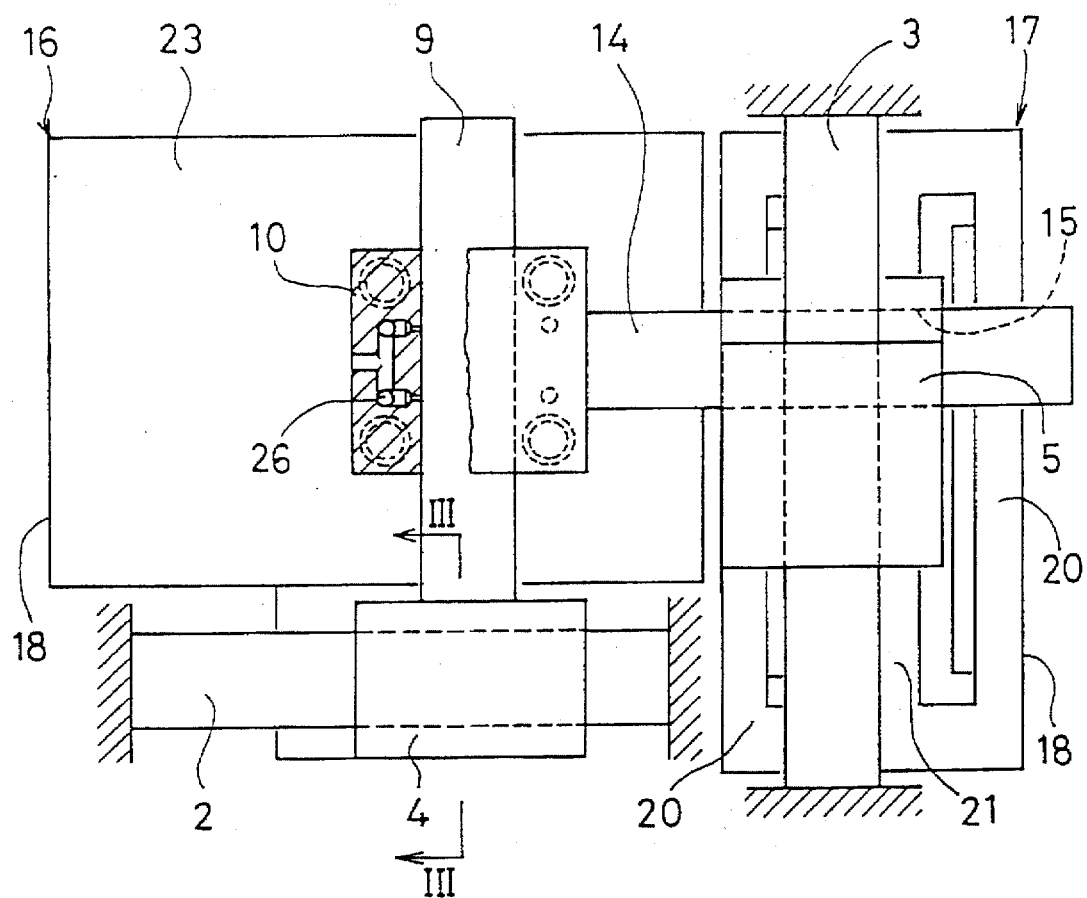
FIG. 1 is a partially cutaway plan view of a first embodiment of an X-Y table according to this invention.
Figure 2:
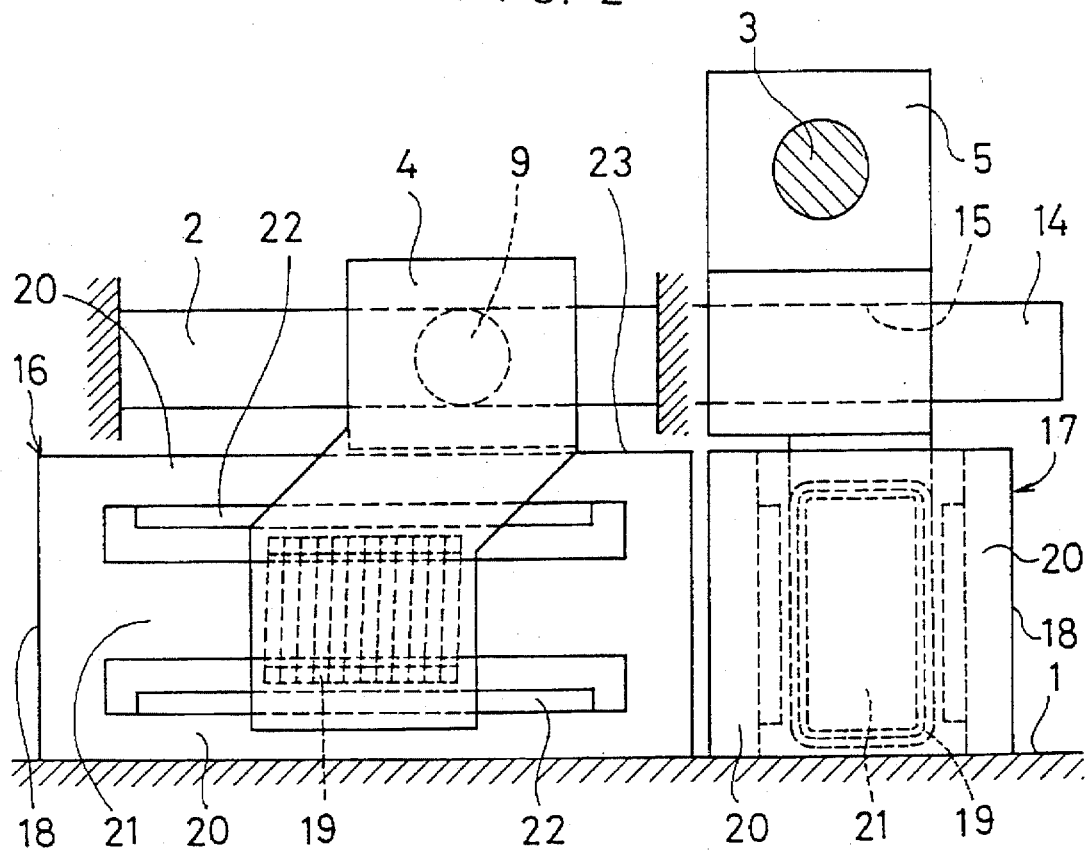
FIG. 2 is its front view.

FIGS. 1–5 show the first embodiment of the X-Y table according to this invention. As shown in FIGS. 1 and 2, two bar guides 2 and 3 are provided perpendicular to each other over a base 1.

In the following description, it is assumed that the bar guide 2 is for the x-axis and the bar guide 3 is for the y-axis. Thus, they are sometimes called x-axis bar guide and y-axis bar guide.

Figure 3:
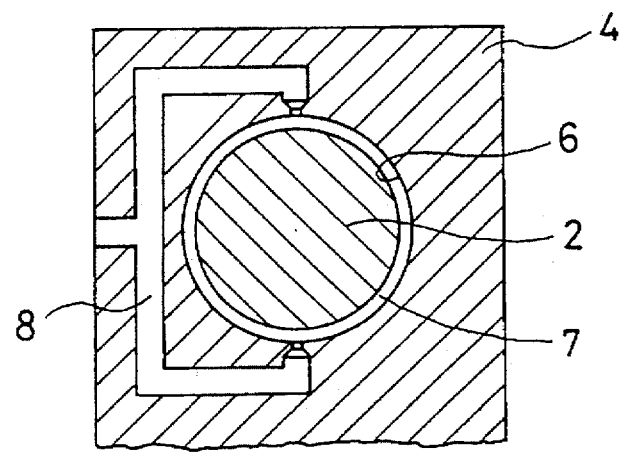
FIG. 3 is a sectional view taken along line III—III of FIG. 1.

Slide blocks 4 and 5 are slidably mounted on the respective bar guides 2 and 3. FIG. 3 shows how the slide block 4 is supported on the bar guide 2. The slide block 4 has a hole 6 through which the bar guide 2 extends. A bearing clearance 7 is present between the wall of the hole 6 and the bar guide 2. The slide block 4 is further formed with an air passage 8 communicating with the bearing clearance 7. Compressed air is fed through the air passage 8 into the bearing clearance 7 to slidably support the slide block 4. Thus, the air passage 8 and the bearing clearance 7 form an air bearing.

A similar air bearing is used to slidably support the other slide block 5 on the bar guide 3.

As shown in FIG. 1, the slide block 4, slidably supported on the x-axis bar guide 2, is fixed to one end of a y-axis sub-bar-guide 9 extending parallel to the y-axis bar guide 3. A stage 10 is slidably mounted on the sub-bar guide 9.

Figure 4:
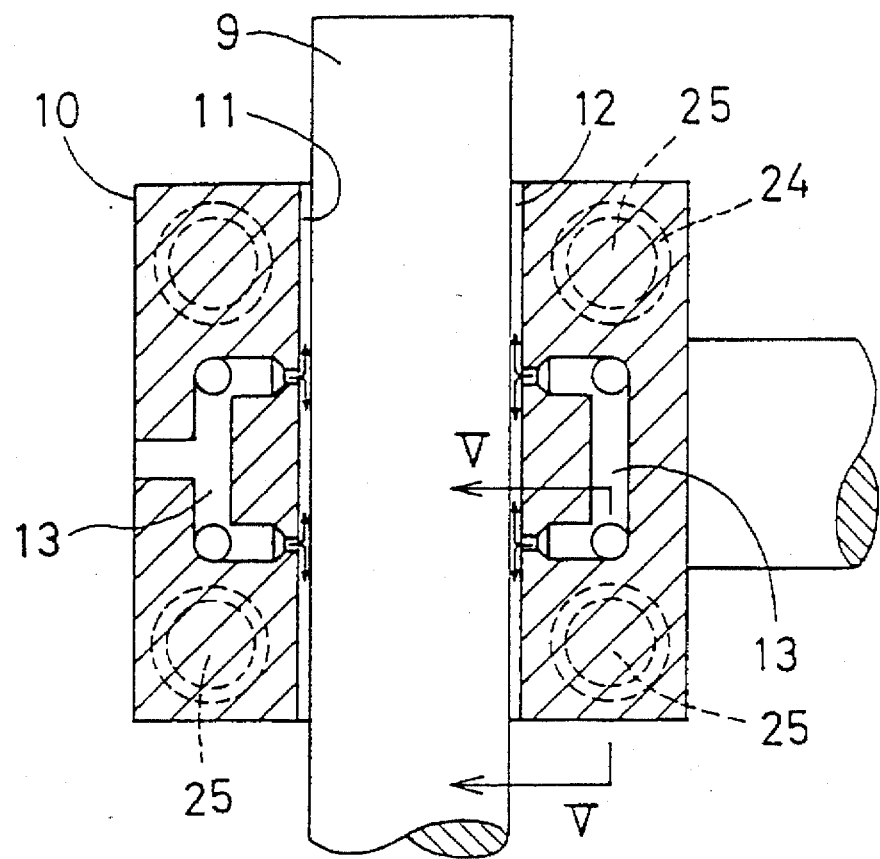
FIG. 4 is a plan view in cross-section of a stage of the just embodiment

As shown in FIG. 4, the stage 10 has a hole 11 through which the sub-bar guide 9 extends. A bearing clearance 12 is present between the hole 11 and the sub-bar guide 9. The stage 10 is also formed with an air passage 13 communicating with the bearing clearance 12. Compressed air is fed through the air passage 13 into the bearing clearance 12 to slidably support the stage 10 as an air bearing.

The stage 10 is fixed to one end of an x-axis sub-bar guide 14 extending parallel to the x-axis bar guide 2. The sub-bar guide 14 extends through a hole 15 formed in the slide block 5 slidably supported on the y-axis bar guide 3, and is slidably supported by the slide block 5 through an air bearing similar to the air bearing shown in FIG. 3.

The slide block 4 is moved along the x-axis bar guide 2 by an x-axis linear motor 16.

The slide block 5 is moved along the y-axis bar guide 3 by a y-axis linear motor 17.

The x-axis linear motor 16 and the y-axis linear motor 17 each comprise a yoke 18 and a coil 19. The yoke 18 comprises a pair of side yokes 20 and a center yoke 21 provided between the side yokes 20. The coil 19 is mounted on the center yoke 21 with a predetermined gap formed between the inner periphery of the coil 19 and the outer periphery of the center yoke 21.

The side yokes 20 carry permanent magnets 22 on the surfaces opposite the center yoke 21.

The yoke 18 of the x-axis linear motor 16 is fixed to the base 1 under the stage 10 with its side yokes 20 arranged one over the other. Its coil 19 is fixed to the bottom of the slide block 4.

The yoke 18 of the y-axis linear motor 17 is fixed to the base 1 with its side yokes 20 arranged at opposite sides. Its coil 19 is fixed to the bottom of the slide block 5.

Thus, by activating the coil 19 of the x-axis linear motor 16, the slide block 4 and thus the stage 10 is moved along the x-axis bar guide 2. By activating the coil 19 of the y-axis linear motor 17, the slide block 5 and thus the stage 10 is moved along the y-axis bar guide 3.

Figure 5:
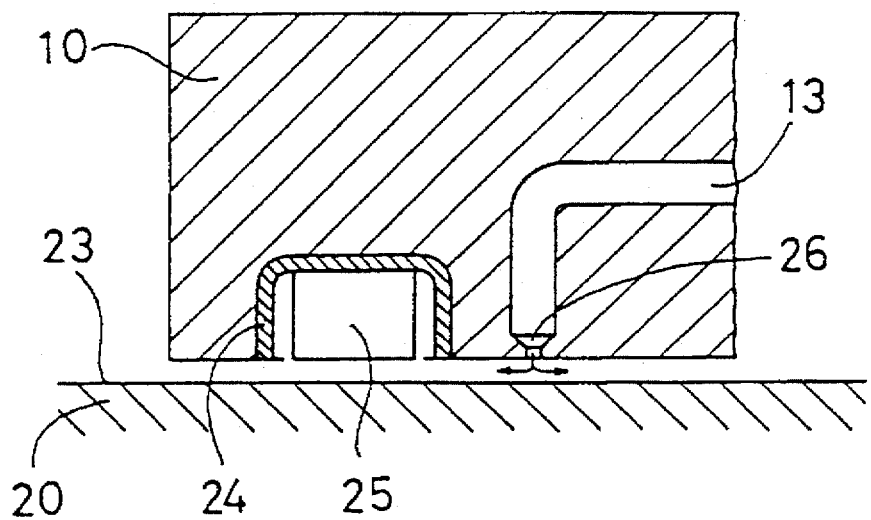
FIG. 5 is a sectional view taken along line V—V of FIG. 4.

The yoke 18 of the x-axis linear motor 16 has a guide surface 23 on which the stage 10 slides. As shown in FIGS. 4 and 5, the stage 10 has cup-shaped yokes 24 buried in the four corners of its bottom surface opposite the guide surface 23. A permanent magnet 25 is mounted in each yoke 24 to produce a magnetic circuit between the yokes 24 and the stage 10.

The stage 10 is also formed with a plurality of nozzles 26 opening to the bottom of the stage 10. Each nozzle 26 communicates with an air passage 13. Compressed air is injected through the nozzles 26 against the guide surface 23. The stage 10 is kept out of contact with the yoke 18 at a position where the pressure of the air film formed between the guide surface 23 and the stage balances with the magnetic attraction force of the permanent magnets 25. The gap formed between the stage 10 and the guide surface 23 of the yoke 18 is kept at several micrometers.

In order to locate the stage 10 in position, compressed air is injected through the nozzles 26 against the guide surface 23 until the pressure of the air film formed between the bottom of the stage 10 and the guide surface 23 of the yoke 24 balances with the magnetic attraction force of the permanent magnets 25 to keep the stage 10 out of contact with the guide surface 23.

At the same time, compressed air is fed into the air passage 3 shown in FIG. 3 to form an air bearing between the slide block 4 and the bar guide 2, thereby keeping the slide block 4 out of contact with the bar guide 2. The slide block 5 on the y-axis bar guide 3 and the x-axis sub-bar guide 14 are also kept out of contact with their respective support members by similar air bearings.

In this state, the x-axis linear motor 16 is activated to move the slide block 4 and thus the stage 10 along the x-axis bar guide 2. The y-axis linear motor 17 is also activated to move the slide block 5 and thus the stage 10 along the y-axis bar guide 3.

While the stage 10 is being moved on the guide surface 23, it is kept out of contact with the guide surface 23. The slide blocks 4 and 5 slide along the x-axis bar guide 2 and the y-axis bar guide 3, respectively, while kept out of contact with them. Thus, no dust will be produced.

Since the stage 10 is guided while kept out of contact with other members, no large driving force is necessary to move it. The x-axis linear motor 16 is used to move only the slide block 4, stage 10 and two sub-bar guides 9 and 14. The y-axis linear motor 17 drives only the slide block 5, stage 10 and x-axis sub-bar guide 14. The total weight of these moving parts are fairly small, so that the stage 10 can be easily controlled and moved to a desired position with high accuracy, using small linear motors.

Figure 6:
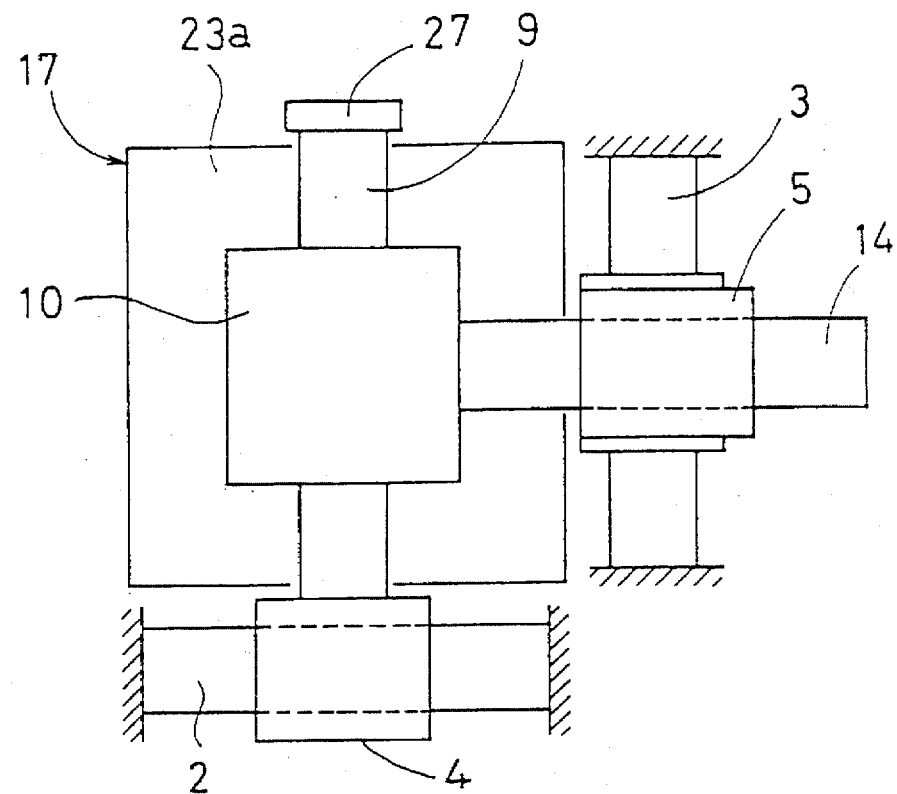
FIG. 6 is a plan view of a second embodiment of an X-Y table according to this invention.
Figure 7:
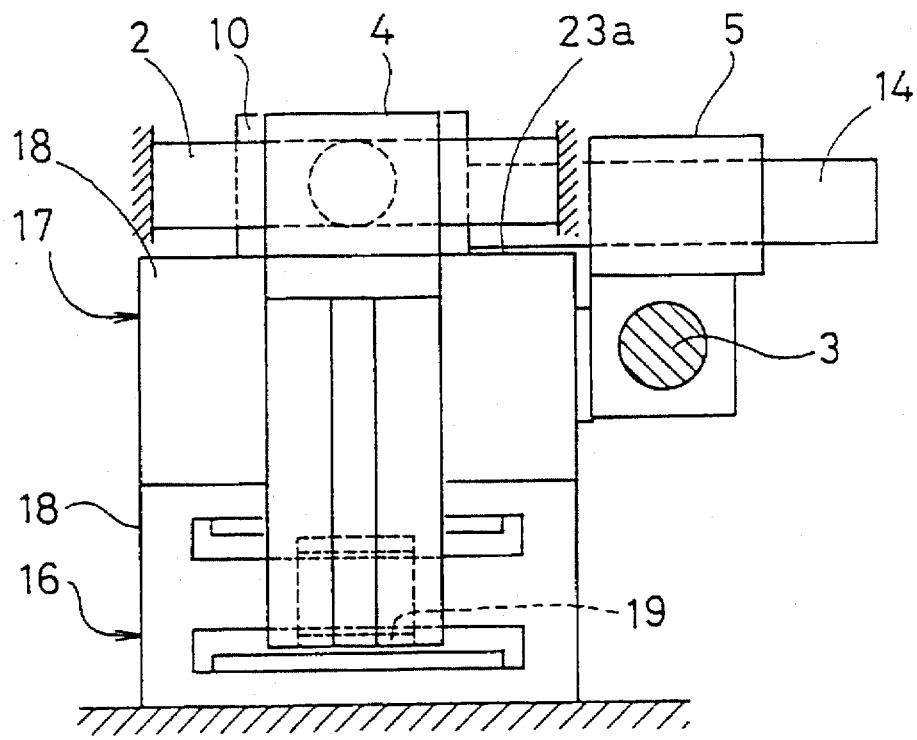
FIG. 7 is a front view of the second embodiment.
Figure 8:
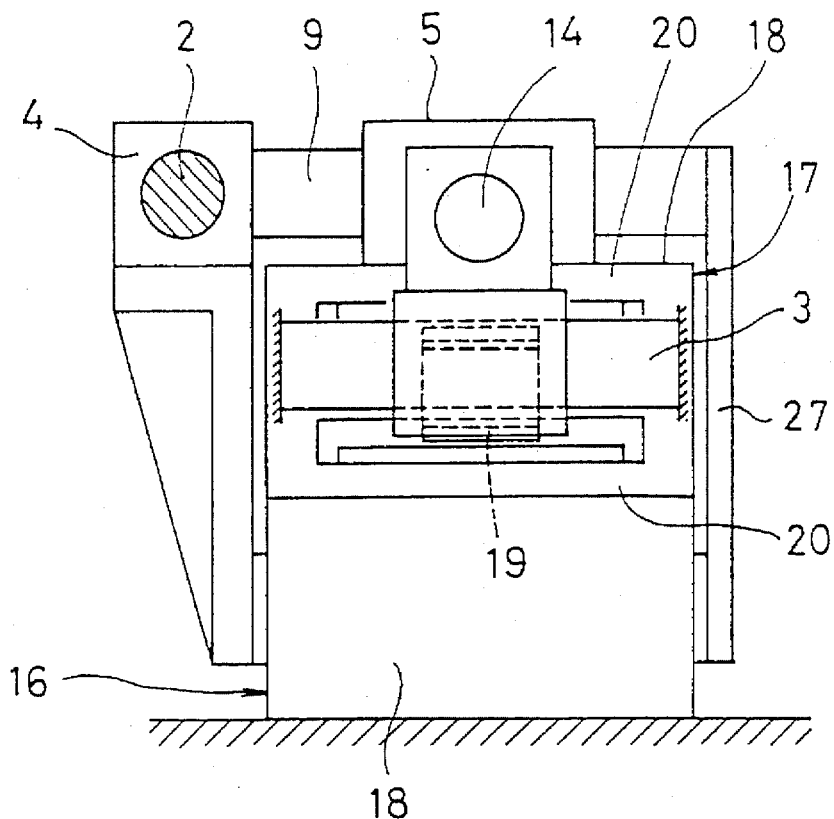
FIG. 8 is a side view of the second embodiment.

FIGS. 6 through 8 show the second embodiment of this invention. In this embodiment, the yoke 18 of the y-axis linear motor 17 is mounted on the yoke 18 of the x-axis linear motor 16, with its side yokes 20 arranged one over the other. The y-axis yoke 18 has a guide surface 23a on which the stage 10 slides.

To stably hold the coil 19 of the x-axis linear motor 16, it is supported on an arm 27 fixed to one end of the y-axis sub-bar guide 9.

Otherwise, this embodiment is structurally no different from the first embodiment. The same elements or parts are denoted by the same numerals. Their description is omitted. This embodiment functions in exactly the same way as the first embodiment. Description of the function is therefore omitted, too.

Figure 10:
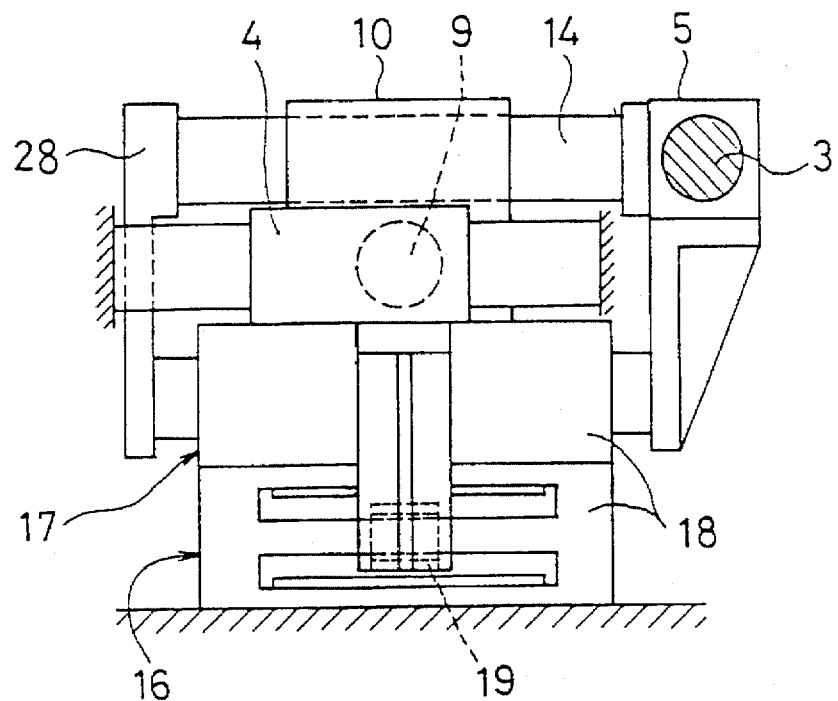
FIG. 10 is a front view of the third embodiment.
Figure 11:
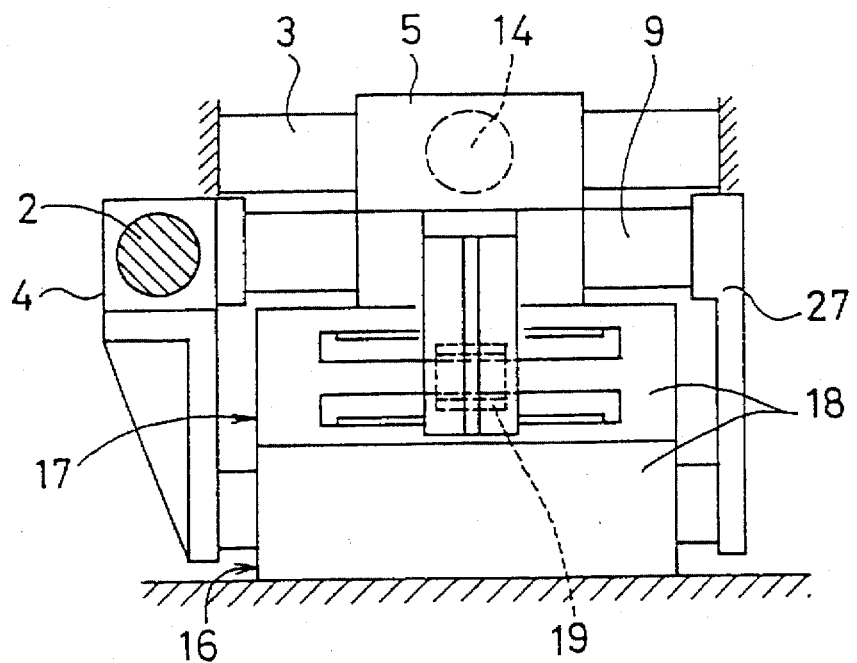
FIG. 11 is a side view of the third embodiment.
Figure 9:
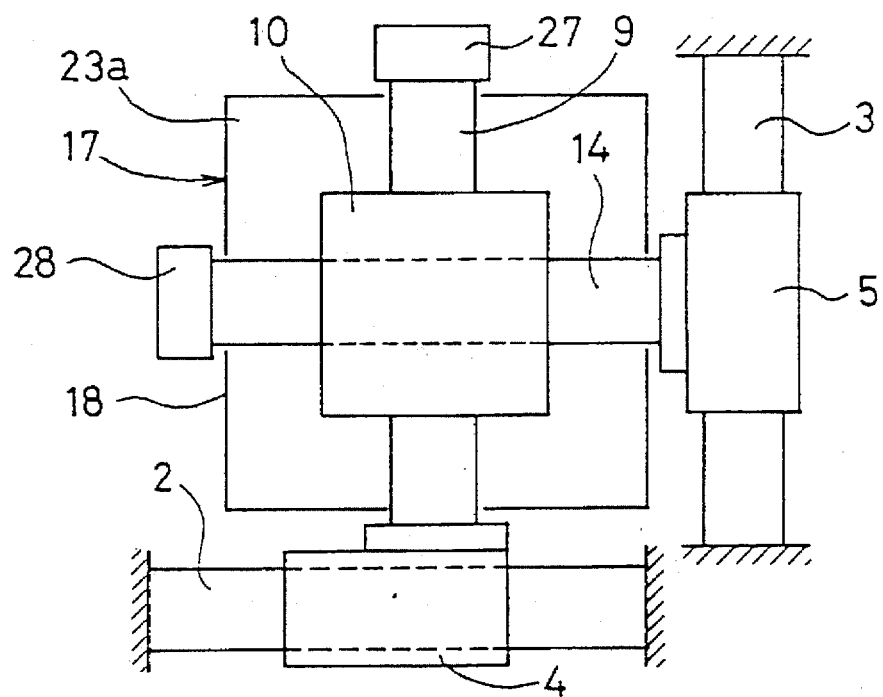
FIG. 9 is a plan view of a third embodiment of an X-Y table according to this invention.

FIGS. 9 to 11 show the third embodiment of this invention. In this embodiment, the x-axis sub-bar guide 14 used in the second embodiment is provided at a higher level than the y-axis sub-bar guide 9. It extends through the stage 10 to slidably support the stage 10 through an air bearing. Its one end is fixed to a slide block 5 slidably supported on the y-axis bar guide 3.

An arm 28 has its top end fixed to the other end of the x-axis sub-bar guide 14. The coil 19 of the y-axis linear motor 17 is supported on the bottom end of the arm 28 and that of the slide block 5.

This embodiment is otherwise the same as the second embodiment. The same numerals are used to indicate the same or similar elements. Description of such elements is omitted here.

Since the x-axis sub-bar guide 14 in the third embodiment is supported at both ends, the stage 10 can be supported more stably.

According to this invention, no dust is produced because the stage touches no other members while moving. Thus, there is no possibility of the positioning accuracy decreasing due to wear.

Because the stage is kept out of contact with other members, it can be moved with a small driving force. The total weight of the moving parts is small, so that the stage can be easily moved to a desired position with extremely high accuracy.

What is claimed is:

1. An X-Y table comprising:

a base;

an x-axis bar guide and a y-axis bar guide extending perpendicular to each other over said base;

two slide blocks slidably supported on said x-axis bar guide and said y-axis bar guide, respectively, by air bearings;

a y-axis sub-bar guide extending parallel to said y-axis bar guide and having one end thereof fixed to one of said two slide blocks supported on said x-axis bar guide;

an x-axis sub-bar guide extending parallel to said x-axis bar guide and having one end thereof fixed to the other of said two slide blocks;

a stage slidably supported on said y-axis sub-bar guide by an air bearing, wherein said x-axis sub-bar guide has one end thereof fixed to said stage;

an x-axis linear motor and a y-axis linear motor for moving said respective slide blocks along said X-axis bar guide and said Y-axis bar guide, said motors each having a yoke supported on said base, said yoke of said x-axis linear motor having a guide surface for guiding movement of said stage, and said stage having a bottom surface opposite to said guide surface; and a permanent magnet in said bottom surface of said stage for creating a magnetic circuit between said stage and said yoke of said x-axis linear motor, said stage further comprising a plurality of nozzles for injecting compressed air into a space between said stage and said guide surface.

2. An X-Y table comprising:

a base;

an x-axis bar guide and a y-axis bar guide extending perpendicular to each other over said base;

two slide blocks slidably supported on said x-axis bar guide and said y-axis bar guide, respectively, by air bearings;

a y-axis sub-bar guide extending parallel to said y-axis bar guide and having one end thereof fixed to one of said two slide blocks supported on said x-axis bar guide;

an x-axis sub-bar guide extending parallel to said x-axis bar guide and having one end thereof fixed to the other of said two slide blocks;

a stage slidably supported on said y-axis sub-bar guide and said x-axis sub-bar guide by respective air bearings;

an x-axis linear motor and a y-axis linear motor for moving said respective slide blocks along said X-axis bar guide and said Y-axis bar guide, said motors each having a yoke, one of said yokes of said linear motors having a guide surface for guiding movement of said stage, and said stage having a bottom surface opposite to said guide surface; and a permanent magnet in said bottom surface of said stage for creating a magnetic circuit between said stage and said one of said yokes, said stage further comprising a plurality of nozzles for injecting compressed air into a space between said stage and said guide surface.

3. An X-Y table comprising:

a base;

an x-axis bar guide and a y-axis bar guide extending perpendicular to each other over said base;

two slide blocks slidably supported on said x-axis bar guide and said y-axis bar guide, respectively, by air bearings;

a y-axis sub-bar guide extending parallel to said y-axis bar guide and having one end thereof fixed to the one of said two slide blocks supported on said x-axis bar guide;

an x-axis sub-bar guide extending parallel to said x-axis bar guide and having one end thereof fixed to the other of said two slide blocks;

a stage slidably supported on one of said y-axis sub-bar guide and said x-axis sub-bar guide by an air bearing and connected to the other of said y-axis sub-bar guide and said x-axis sub-bar guide for movement therewith;

an x-axis linear motor and a y-axis linear motor connected to said two slide blocks, respectively, for moving said respective slide blocks along said X-axis bar guide and said Y-axis bar guide, said motors each having a yoke, one of said yokes of said linear motors having a guide surface for guiding movement of said stage, and said stage having a bottom surface opposite to said guide surface; and a permanent magnet in said bottom surface of said stage for creating a magnetic circuit between said stage and said one of said yokes, said stage further comprising a plurality of nozzles for injecting compressed air into a space between said stage and said guide surface.

* * * * *